(12) United States Patent
Isshiki et al.

(10) Patent No.: US 9,985,779 B2
(45) Date of Patent: *May 29, 2018

(54) ENCRYPTED TEXT MATCHING SYSTEM, METHOD, AND COMPUTER READABLE MEDIUM

(71) Applicant: NEC CORPORATION, Tokyo (JP)

(72) Inventors: Toshiyuki Isshiki, Tokyo (JP); Kengo Mori, Tokyo (JP); Toshinori Araki, Tokyo (JP)

(73) Assignee: NEC CORPORATION, Tokyo (JP)

(*) Notice: Subject to any disclaimer, the term of this patent is extended or adjusted under 35 U.S.C. 154(b) by 181 days.

This patent is subject to a terminal disclaimer.

(21) Appl. No.: 14/786,680

(22) PCT Filed: Apr. 23, 2014

(86) PCT No.: PCT/JP2014/061437
§ 371 (c)(1),
(2) Date: Oct. 23, 2015

(87) PCT Pub. No.: WO2014/175334
PCT Pub. Date: Oct. 30, 2014

(65) Prior Publication Data
US 2016/0072624 A1    Mar. 10, 2016

(30) Foreign Application Priority Data

Apr. 24, 2013  (JP) .................... 2013-091468

(51) Int. Cl.
*H04L 9/06* (2006.01)
*H04L 9/00* (2006.01)
(Continued)

(52) U.S. Cl.
CPC ............ *H04L 9/0618* (2013.01); *G06F 21/32* (2013.01); *G06F 21/6245* (2013.01);
(Continued)

(58) Field of Classification Search
None
See application file for complete search history.

(56) References Cited

U.S. PATENT DOCUMENTS

2003/0219121 A1* 11/2003 van Someren ..... G07C 9/00158
380/44
2008/0222496 A1   9/2008 Tuyls et al.
(Continued)

FOREIGN PATENT DOCUMENTS

JP    2006-158851 A    6/2006
JP    2008-502071 A    1/2008
(Continued)

OTHER PUBLICATIONS

Kelkboom et al. (Multi-Algorithm Fusion with Template Protection), 978-1-4244-5020-6/09, IEEE '09.*
(Continued)

*Primary Examiner* — Peter Poltorak
(74) *Attorney, Agent, or Firm* — Sughrue Mion, PLLC

(57) ABSTRACT

An encrypted text matching system is provided. The system is configured to generate first auxiliary data and second auxiliary to verify matching between a first encrypted text that is and a second encrypted text based on a Hamming distance between plaintexts; perform one-way conversion on at least part of the first auxiliary data; perform one-way conversion on intermediate data that is generated based on a difference between the first encrypted text and the second encrypted text and on the second auxiliary data; and determine, by using a result of the one-way conversion performed on the intermediate data as well as using the first auxiliary data that underwent the one-way conversion, whether a Hamming distance between plaintexts is equal to or less than a predetermined certain value, the Hamming distance cor-
(Continued)

responding to the difference between the first encrypted text and the second encrypted text.

7 Claims, 6 Drawing Sheets

(51) Int. Cl.
    *G06F 21/32*     (2013.01)
    *G06F 21/62*     (2013.01)
    *H04L 9/08*     (2006.01)
    *H04L 9/32*     (2006.01)

(52) U.S. Cl.
CPC ............ *H04L 9/002* (2013.01); *H04L 9/008* (2013.01); *H04L 9/06* (2013.01); *H04L 9/0819* (2013.01); *H04L 9/3231* (2013.01); *H04L 9/3236* (2013.01); *H04L 2209/24* (2013.01); *H04L 2209/34* (2013.01)

(56) References Cited

U.S. PATENT DOCUMENTS

| | | | |
|---|---|---|---|
| 2008/0304657 A1* | 12/2008 | Tuyls | H04L 9/008 380/28 |
| 2010/0014655 A1 | 1/2010 | Chmora et al. | |
| 2011/0026781 A1* | 2/2011 | Osadchy | G06K 9/00221 382/118 |

FOREIGN PATENT DOCUMENTS

| | | |
|---|---|---|
| WO | 2011/052056 A1 | 5/2011 |
| WO | 2014/010725 A1 | 1/2014 |

OTHER PUBLICATIONS

Pim Tuyls, et al., "Practical Biometric Authentication with Template Protection", Proceedings of AVBPA 2005, Lecture Notes in Computer Science, 2005, pp. 436-446, vol. 3546.

International Search Report for PCT/JP2014/061437 dated Aug. 5, 2014 [PCT/ISA/210].

Written Opinion for PCT/JP2014/061437 dated Aug. 5, 2014 [PCT/ISA/237].

Atallah, et al., "Secure Biometric Authentication for Weak Computational Devices", Aug. 2, 2005, Financial Cryptography and Data Security, 9th International Conference, FC 2005, Roseau, The Commonwealth of Dominica, Feb. 28-Mar. 3, 2005, pp. 357-371 (15 pages), XP019011820.

Communication dated Nov. 22, 2016, from the European Patent Office in counterpart European application No. 14788621.2.

Decision of a Patent Grant from the Japanese Patent Office in a counterpart Application No. 2015-513802.

Toshiyuki Isshiki et al. "New security definitions for biometric authentication with template protection: Toward covering more threats against authentication systems", Proceedings of the 12th International Conference of the Biometrics Special Interest Group (BIOSIG Sep. 2013) 12 pages.

* cited by examiner

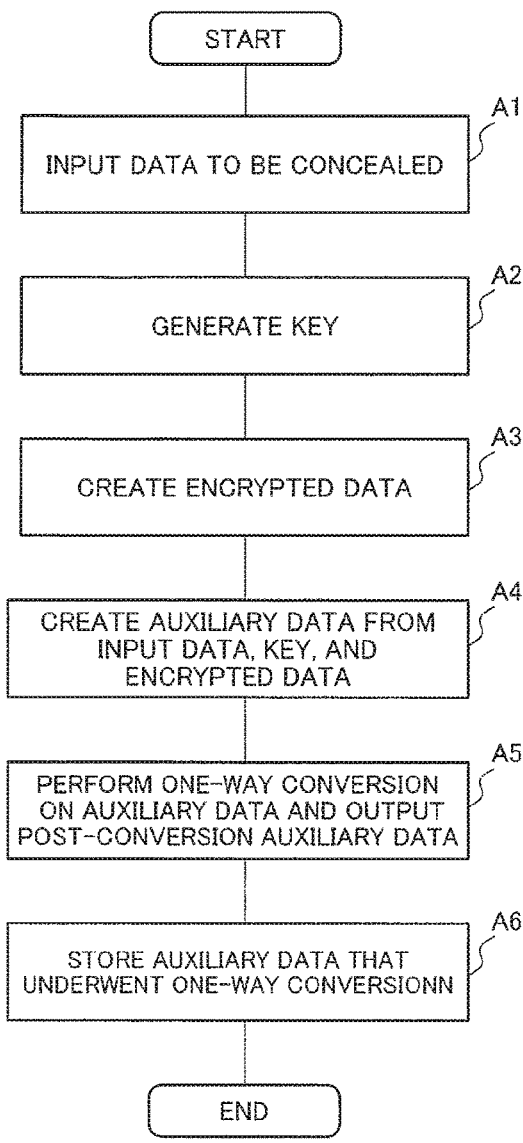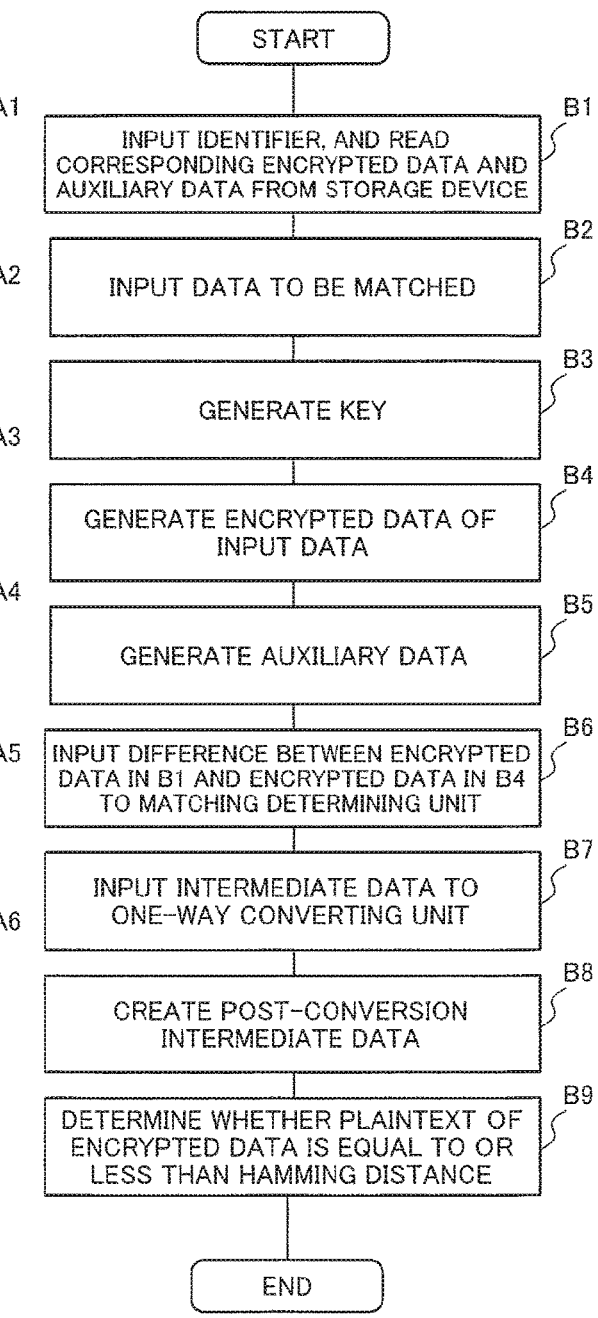

ENCRYPTED TEXT MATCHING SYSTEM, METHOD, AND COMPUTER READABLE MEDIUM

CROSS-REFERENCE TO RELATED APPLICATION

This application is a National Stage of International Application No. PCT/PCT/JP2014/061437, filed on Apr. 23, 2014, which claims priority from Japanese Patent Application No. 2013-091468 (filed on Apr. 24, 2013), the entire content of which is herein incorporated by reference as if fully set forth herein.

The present invention relates to an encrypted text matching system, method, and computer readable medium.

TECHNICAL FIELD

Background Art

With the wide-spreading cloud computing, there has recently been a rapid expansion of services based on the user data stored in computational resources connected to networks. Such services more often involve opportunities to deal with sensitive user data. Therefore, it is becoming important to assure users that their data is securely managed. Under such circumstances, research and development are actively promoted for techniques to manage data that remains encrypted in open network environments and to perform searches, statistical processing, and the like on the data without decrypting it.

In addition, crimes are more frequently occurring that exploit the vulnerability of personal authentication based on passwords or magnetic cards. Thus, more secure biometric authentication techniques using biological features such as fingerprints or veins are drawing attention. Biometric authentication requires the template related to biometric information to be stored in a database in order to verify authentication information. Biometric information such as fingerprints or veins is the data that is basically unchanged through one's lifetime. Biometric information requires highest-level security protection because serious damages will occur if such information is leaked. Thus, impersonation or the like must be prevented even when the template is leaked.

Accordingly, it is becoming important to have a template protection type biometric authentication technique which performs authentication with the template information concealed.

For example, PTL 1 discloses a method for performing biometric authentication by representing fingerprint data as points on a polynomial expression, adding random points to the points to conceal the fingerprint data, and using the concealed data as a template.

However, the method of PTL 1 is known to be problematic concerning whether the biometric information still remains protected with adequate strength after biometric authentication is repeated many times.

NPL 1 discloses a method for protecting biometric information by masking a template stored in a database with a random Bose-Chaudhuri-Hocquenghem (BCH) code word. According to NPL 1, biometric information Z and secret information S are used to generate a template for biometric authentication. FIG. 5 is a diagram based on NPL 1's FIG. 2, with the feature extraction, statistical analysis, quantization, and the like shown in FIG. 2 in NPL 1 omitted. The enrollment of a template is performed as described below.

(1) Input the secret information S to an encoder (enc), perform error correcting coding (ECC) and generate a code word C. For ECC, binary BCH codes with parameters (K, s, d) are used, where K denotes the length of the code words, s the number of information symbols, and d the number of errors that can be corrected.

(2) Calculate an exclusive OR between C and Z, namely $W2=C (+) Z$ (where (+) represents a bitwise exclusive OR operation (bitwise XOR)).

(3) Input S to a cryptographic (one-way) hash function H, such as Secure Hash Algorithm (SHA)-1, and obtain a hash value H(S).

(4) Store W2 and H(S) as template information in a database (DB).

Verification of whether the template generated through the above steps (1) to (4) and another piece of biometric information Z' have been obtained from the same person is performed as described below.

(1) Calculate an exclusive OR between Z' and W2, namely $C'=W2 (+) Z'=C (+) (Z (+) Z')$.

(2) Input C' to a decoder (DEC), perform error-correcting decoding of the BCH code and calculate S'.

(3) Input S' to a cryptographic (one-way) hash function H, such as SHA-1, and calculate a hash value H(S').

(4) Read H(S) from the DB and check whether $H(S)=H(S')$ is satisfied. If $H(S)=H(S')$ is satisfied, it is determined that the template and the biometric information Z' were taken from the same person. If $H(S)=H(S')$ is not satisfied, it is determined that the template and the biometric information Z' were taken from different persons.

The above-described method is not dependent on how the biometric information Z is obtained. Therefore, in general, the method can be regarded as a method for checking whether an encrypted text has been obtained by encrypting data that falls within a certain Hamming distance from the presented data, without decrypting concealed (encrypted) data.

CITATION LIST

Patent Document

PTL 1: Japanese Unexamined Patent Application Publication No. 2006-158851

Non Patent Literature

NPL 1: Pim Tuyls, Anton H. M. Akkermans, Tom A. M. Kevenaar, Geert-Jan Schrijen, Asker M. Bazen and Raimond N. J. Veldhuis, "Practical Biometric Authentication with Templete Protection", Proceedings of AVBPA 2005, Lecture Notes in Computer Science, Vol. 3546, Springer Verlag, pp. 436-446, (2005)

SUMMARY OF INVENTION

Technical Problem

Analyses of related arts are provided below.

A problem of the above-described related arts is that information about a plaintext might be leaked during matching with an encrypted text stored in a database to the administrator or the like who performs the matching. The following describes the reasons.

For example, with regard to PTL 1 above, such leaks might occur due to insufficient concealing strength on encrypted texts.

With regard to NPL 1 above, such leaks might occur because, in order to make it possible to check whether an encrypted text has been obtained by encrypting data that falls within a certain Hamming distance from the presented data, information about a plaintext needs to be transmitted during the checking.

As described above, information about the original plaintext might be leaked when the matching process is carried out more than once, and sufficient security cannot be assured if, for example, the database administrator or the like performing matching operations has malicious intent. For example, in view of applications of biometric authentication, a leak of biometric information from the data transmitted during the matching can be regarded as a problem as serious as a leak of biometric information from the registered data. Existing biometric authentication methods that protect templates only address the security against leaks of biometric information from registered templates. However, in order to pay attention to the security of biometric authentication itself, consideration needs to be given to leaks of information from the data transmitted during the matching. In addition, when the security of authentication is taken into consideration, it is a problem that the data transmitted during the matching can be used to generate the data judged as identical to the transmitted data. For example, the method described in NPL 1 above allows for the matching by obtaining and retransmitting the value Z'. From the viewpoint of biometric authentication, this conduct means that it is possible to impersonate a person by obtaining the data that was transmitted from the person for his/her authentication.

Accordingly, the present invention has been created in view of the above problems, with an object of providing a system, method, and computer readable medium that can avoid leaks of information about the original plaintext and assure security when performing the matching of encrypted texts.

Solution to Problem

According to the present invention, an encrypted text matching system is proved, the encrypted text matching system includes: an auxiliary data generating unit configured to generate first auxiliary data and second auxiliary data, respectively, which are for verification of matching between a first encrypted text that is obtained by encrypting input data and is registered with a storage device and a second encrypted text that is obtained by encrypting input data to be matched, the verification being performed by using a Hamming distance between plaintexts; and a matching determining unit configured to perform one-way conversion on at least part of the first auxiliary data, perform one-way conversion on intermediate data that is generated based on a difference between the first encrypted text and the second encrypted text and on the second auxiliary data, and determine, by using a result of the one-way conversion performed on the intermediate data as well as using the first auxiliary data that underwent the one-way conversion, whether a Hamming distance between plaintexts is equal to or less than a predetermined certain value, the Hamming distance corresponding to the difference between the first encrypted text and the second encrypted text.

A biometric authentication system according to the present invention is provided, the biometric authentication system including the above-described encrypted text matching system.

A method for matching encrypted texts according to the present invention is provided, and the method includes: generating first auxiliary data and second auxiliary data, respectively, which are for verification of matching between a first encrypted text that is obtained by encrypting input data and is registered with a storage device and a second encrypted text that is obtained by encrypting input data to be matched, the verification being performed by using a Hamming distance between plaintexts; and performing one-way conversion on at least part of the first auxiliary data, performing one-way conversion on intermediate data that is generated based on a difference between the first encrypted text and the second encrypted text and on the second auxiliary data, and determining, by using a result of the one-way conversion performed on the intermediate data as well as using the first auxiliary data that underwent the one-way conversion, whether a Hamming distance between plaintexts is equal to or less than a predetermined certain value, the Hamming distance corresponding to the difference between the first encrypted text and the second encrypted text.

A non-transitory computer readable medium storing a program for matching encrypted texts according to the present invention is provided. The program causes a computer to execute: a process which generates first auxiliary data and second auxiliary data, respectively, which are for verifying, with respect to a first encrypted text that is obtained by encrypting input data and is registered with a storage device and a second encrypted text that is obtained by encrypting input data to be matched, that a Hamming distance between plaintexts corresponding to the first encrypted text and the second encrypted text is equal to or less than a predetermined certain value; and a process which performs one-way conversion on at least part of the first auxiliary data, performs one-way conversion on intermediate data that is generated based on a difference between the first encrypted text and the second encrypted text and on the second auxiliary data, and determines, by using a result of the one-way conversion performed on the intermediate data as well as using the first auxiliary data that underwent the one-way conversion, whether a Hamming distance between plaintexts is equal to or less than a predetermined certain value, the Hamming distance corresponding to the difference between the first encrypted text and the second encrypted text.

According to the present invention, a computer-readable recording medium (magnetic/optical recording medium or semiconductor recording medium) that records the program is provided.

Advantageous Effects of Invention

According to the present invention, it is made possible to avoid leaks of information about an original plaintext and assure security during matching of encrypted texts.

BRIEF DESCRIPTION OF DRAWINGS

FIGS. 2 (A) and 2 (B) are diagrams describing a data registration phase and an encrypted text matching phase, respectively, according to the exemplary embodiment 1 of the present invention.

DESCRIPTION OF EMBODIMENTS

Embodiments of the present invention will be described. First, the basic concept of the present invention is described below. According to one aspect of the present invention, the input data to be matched is encrypted, while the registered data with which the input data will be matched has been encrypted, and a Hamming distance between plaintexts is used as an indicator (indicator of ambiguity) for determining (verifying) the matching (agreement). Not only the registered encrypted data but also the input data for the matching is encrypted through the use of an encryption method having high concealing strength. When the same input data is used to perform the matching more than once, information about a key that is used for concealing data is changed every time the matching is performed. Thus, even when the matching is performed more than once, the present invention can reduce the possibility to cause leaks of information about a plaintext to a low level and contributes to greater resistance to attacks and improved security.

Figure 6:
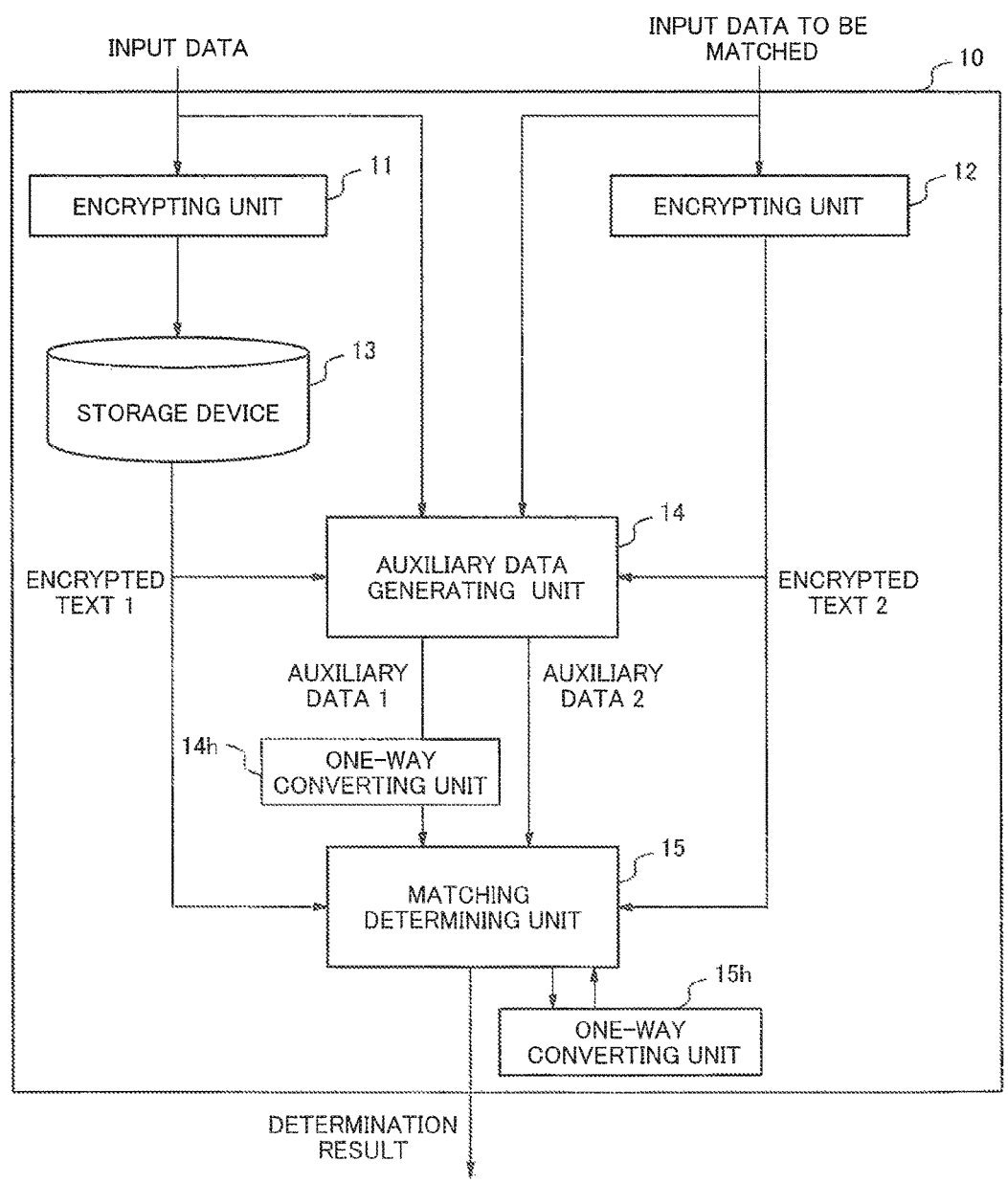
FIG. 6 is an explanatory diagram illustrating the inventive concept.

With reference to FIG. 6, an encrypted text matching system 10 (device) according to one aspect of the present invention includes at least: an auxiliary data generating unit (14) which generates auxiliary data from an encrypted text; and a matching determining unit (15) which makes a determination from the encrypted texts and auxiliary data on the matching between the encrypted input data and the registered encrypted data. The auxiliary data is used for verifying the matching of encrypted texts by using a Hamming distance between plaintexts.

With respect to an encrypted text 1 that is obtained by encrypting input data with an encrypting unit (11) and that is stored in a storage device (13) and an encrypted text 2 that is obtained by encrypting input data to be matched with an encrypting unit (12), the auxiliary data generating unit (14) generates auxiliary data 1 and auxiliary data 2, respectively, which are for verifying that a Hamming distance between plaintexts of the encrypted text 1 and the encrypted text 2 is equal to or less than a predetermined certain value.

The matching determining unit (15) subjects at least part of the auxiliary data 1 to one-way conversion performed by a one-way converting unit (14$h$), subjects intermediate data that is generated based on a difference between the encrypted text 1 and encrypted text 2 and on the auxiliary data 2 to one-way conversion performed by a one-way converting unit (15$h$), and determines, by using a result of the one-way conversion performed on the intermediate data as well as using the auxiliary data 1 that underwent the one-way conversion, whether a Hamming distance between plaintexts that corresponds to the difference between the encrypted text 1 registered with a storage device (13) and the encrypted text 2 of the input data to be matched is equal to or less than a predetermined certain value. Processes and functions of the individual unit in the encrypted text matching system 10 (device) may be implemented by a program to be executed on a computer constituting the encrypted text matching system 10 (device).

According to the present invention, an encrypted text is a result of an exclusive OR operation between a code word, which is obtained by encoding a key for encrypting the plaintext of the input data with an error-correcting code having linearity, and the plaintext; and the first and second auxiliary data related to the encrypted text registered with the storage device and the encrypted text of the input data to be matched are respectively calculated based on an exclusive OR between an inner product of the key and a constant, and a cryptographic hash function applied to the encrypted text and a random number. A cryptographic hash function has a property called pre-image resistance, which unit given a hash value h it is difficult to find an original character string m such that h=hash(m) (a one-way compression function).

In addition, in order to accomplish the matching between two pieces of encrypted data, which is not achieved by NPL 1 described above, the present invention guarantees that, with respect to a hash function for determining a matching result, it is possible to calculate a hash value of the sum of two pieces of data from their hash values.

As described above, according to the present invention, during the matching process between encrypted texts, the data transmitted by the user who is going to do the matching is also encrypted by an encryption key that is unknown to, for example, the database administrator or the like who performs matching operations. Consequently, leaks of information about the original plaintext can be prevented during the matching process, even when the matching is performed more than once or when the database administrator or the like who handles the matching process has malicious intent. Some exemplary embodiments will be described below.

Exemplary Embodiment 1

Figure 1:
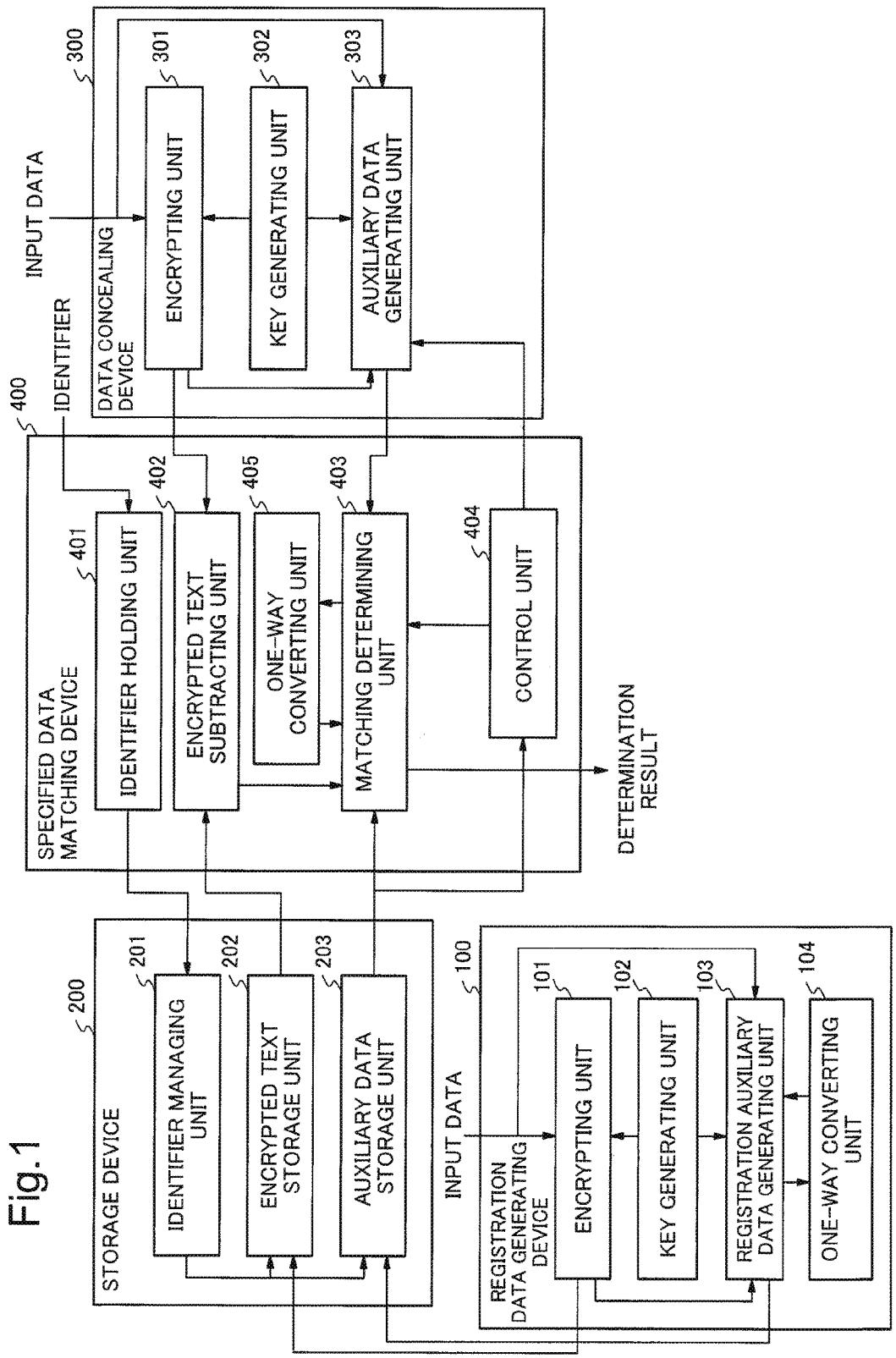
FIG. 1 is a diagram illustrating an example configuration according to an exemplary embodiment 1 of the present invention.

With reference to FIG. 1, a system according to an exemplary embodiment 1 of the present invention includes a registration data generating device 100, a storage device 200, a data concealing device 300, and a specified data matching device 400. Note that these devices may be configured to gather at a single site or the like to form a single apparatus, or may be configured to be distributed and connected to one another via a communication means.

The registration data generating device 100 includes an encrypting unit 101, a key generating unit 102, a registration auxiliary data generating unit 103, and a one-way converting unit 104.

The encrypting unit 101 receives input data to be concealed and a key to be used for concealing the input data, as inputs, and outputs encrypted data obtained by applying the concealing process with the key to the input data.

The key generating unit 102 generates a key to be used for the encrypting unit 101 to conceal the input data, and then outputs the generated key to the encrypting unit 101 and to the registration auxiliary data generating unit 103.

The registration auxiliary data generating unit 103 receives: input data;
encrypted data output from the encrypting unit 101; and
a key output from the key generating unit 102,
as inputs. The registration auxiliary data generating unit 103 outputs data for determining whether a Hamming distance between the input data corresponding to the encrypted data output from an encrypting unit 301 in the data concealing device 300 and the input data in the encrypting unit 101 is equal to or less than a predetermined certain value (within a certain numerical range).

The one-way converting unit 104 outputs the result of one-way conversion performed on part or all of the data (intermediate data) generated by the registration auxiliary data generating unit 103.

The encrypted text output from the encrypting unit 101 in the registration data generating device 100 satisfies the following:

let $c_1$ be the encrypted text obtained by encrypting the input data $m_1$ with the key $k_1$; and let $c_2$ be the encrypted text obtained by encrypting the input data $m_2$ with the key $k_2$; then the sum of $c_1$ and $c_2$, $c_1+c_2$, is the encrypted text obtained by encrypting the input data $m_1+m_2$ with the key $k_1+k_2$.

The storage device 200 includes an identifier managing unit 201, an encrypted text storage unit 202, and an auxiliary data storage unit 203. The encrypted text storage unit 202 and the auxiliary data storage unit 203 respectively receive and store the encrypted data and registration auxiliary data output from the registration data generating device 100. The encrypted text storage unit 202 and the auxiliary data storage unit 203 may be configured as databases (or may be comprised of files).

During the matching of encrypted data, the encrypted text storage unit 202 and the auxiliary data storage unit 203 output to the specified data matching device 400, under the control of the identifier managing unit 201, the encrypted data and auxiliary data corresponding to an identifier which input from the specified data matching device 400.

The identifier managing unit 201 in the storage device 200 manages identifiers that uniquely identify encrypted data and auxiliary data which input from the registration data generating device 100.

When an identifier which input from the specified data matching device 400, the identifier managing unit 201 outputs to the encrypted text storage unit 202 and to the auxiliary data storage unit 203 an instruction to respectively output the encrypted data and the auxiliary data corresponding to the input identifier.

The encrypted text storage unit 202 stores the encrypted data output from the encrypting unit 101 in the registration data generating device 100 and, when an instruction to output encrypted data is input from the identifier managing unit 201, the encrypted text storage unit 202 outputs the corresponding encrypted data.

The auxiliary data storage unit 203 stores the auxiliary data output from the registration auxiliary data generating unit 103 in the registration data generating device 100 and, when an instruction to output encrypted data is input from the identifier managing unit 201, the auxiliary data storage unit 203 outputs the corresponding auxiliary data.

The data concealing device 300 includes an encrypting unit 301, a key generating unit 302, and an auxiliary data generating unit 303.

The encrypting unit 301 receives input data to be concealed (input data to be matched) and a key to be used for concealing the input data, as inputs, and outputs encrypted data obtained by applying the concealing process with the key to the input data.

The key generating unit 302 generates a key to be used for the encrypting unit 101 to conceal the input data, and then outputs the generated key to the encrypting unit 301 and to the auxiliary data generating unit 303.

The auxiliary data generating unit 303 receives, the input data (input data to be matched);

encrypted data output from the encrypting unit 301; and a key output from the key generating unit 302 to the encrypting unit 301, as inputs. The auxiliary data generating unit 303 outputs the auxiliary data for determining whether a Hamming distance between the input data (plaintext) corresponding to the encrypted data (registered encrypted data) output from the encrypting unit 101 in the registration data generating device 100 and the input data (plaintext) as input to the encrypting unit 301 is equal to or less than a predetermined certain value (within a certain numerical range). The auxiliary data is auxiliary information used for determining that the registered encrypted data matches the input data if a Hamming distance between the input data (plaintext) corresponding to the registered encrypted data and the input data to be matched (plaintext) as input to the encrypting unit 301 is not greater than (or is less than) a predetermined value, and for determining that the registered encrypted data does not match (does not agree with) the input data if the Hamming distance is greater than (or no smaller than) a predetermine value.

The encrypted text output from the encrypting unit 301 in the data concealing device 300 is calculated in the same way as in the encrypting unit 101. That is:

let $c_1$ be the encrypted text obtained by encrypting the input data $m_1$ with the key $k_1$; and let $c_2$ be the encrypted text obtained by encrypting the input data $m_2$ with the key $k_2$; then the sum of $c_1$ and $c_2$, $c_1+c_2$, is the encrypted text obtained by encrypting the input data $m_1+m_2$ with the key $k_1+k_2$.

The specified data matching device 400 includes an identifier holding unit 401, an encrypted text subtracting unit 402, a matching determining unit 403, a control unit 404, and a one-way converting unit 405.

The identifier holding unit 401 receives an identifier, as an input, and outputs an instruction to the identifier managing unit 201 in the storage device 200 to output the encrypted text data and the auxiliary data that correspond to the identifier in the storage device 200.

The encrypted text subtracting unit 402 receives:

one piece of encrypted data (registered encrypted data) stored in the encrypted text storage unit 202 in the storage device 200; and the encrypted data output from the encrypting unit 301 in the data concealing device 300, as inputs, and outputs a difference $c_1-c_2$ between the two pieces of input encrypted data $c_1$ and $c_2$.

Owing to the properties of the encrypting units 101 and 301, the difference $c_1-c_2$ is expressed as follows:

let $c_1$ be the encrypted text obtained by encrypting the input data $m_1$ with the key $k_1$; and let $c_2$ be the encrypted text obtained by encrypting the input data $m_2$ with the key $k_2$; then the difference $c_1-c_2$ between the two encrypted texts $c_1$ and $c_2$ is the encrypted text obtained by encrypting the input data $m_1-m_2$ with the key $k_1-k_2$.

The matching determining unit 403 receives:

the auxiliary data stored in the auxiliary data storage unit 203 in the storage device 200;

the auxiliary data output from the auxiliary data generating unit 303 in the data concealing device 300; and the difference between two pieces of encrypted data output from the encrypted text subtracting unit 402, as inputs.

The matching determining unit 403 transmits intermediate data generated from the data that includes at least:

the auxiliary data output from the auxiliary data generating unit 303 in the data concealing device 300; and the difference between the two pieces of encrypted data output from the encrypted text subtracting unit 402 to the one-way converting unit 405.

The one-way converting unit 405 returns to the matching determining unit 403 the result of one-way conversion performed on the intermediate data transmitted from the matching determining unit 403.

The matching determining unit 403 outputs a determination, from:

the data generated through one-way conversion performed by the one-way converting unit 405 based on the intermediate data; and one piece of the auxiliary data that was subjected to one-way conversion and stored in the auxiliary data storage unit 203 in the storage device 200, of whether the Hamming distance between plaintexts m1 and m2, which respectively correspond to the encrypted data c1 and c2, as input to the encrypted text subtracting unit 402 is equal to or less than a predetermined certain value.

The control unit 404 controls communications and the like for exchanging data between the data concealing device 300 and the specified data matching device 400.

Operations of the exemplary embodiment 1 will be described with reference to the flowchart in FIGS. 2A and 2B. Operations of the encrypted text matching system according to the exemplary embodiment 1 are broadly divided into two phases: a data registration phase and an encrypted text matching phase.

In the data registration phase, input data is input to the registration data generating device 100, encrypted, and registered with the storage device 200 along with auxiliary data.

In the encrypted text matching phase, the input data input to the data concealing device 300 is encrypted, and then it is determined whether the encrypted data and auxiliary data, as generated in the encryption process, represent plaintexts that are close to the encrypted data and auxiliary data that are stored in the storage device and are specified by an identifier to be separately input (that is, whether the Hamming distance is equal to or less than a predetermined certain value).

In the data registration phase, first, the input data to be concealed is input to the encrypting unit 101 in the registration data generating device 100 (Step A1 in FIG. 2A).

Next, the key generating unit 102 in the registration data generating device 100 generates a key to be used for concealing the input data and outputs the key to the encrypting unit 101 and to the registration auxiliary data generating unit 103 (Step A2 in FIG. 2A).

Next, the encrypting unit 101 in the registration data generating device 100 calculates encrypted data that is obtained by encrypting the input data using the input data and the key, and then stores the encrypted data in the encrypted text storage unit 202 in the storage device 200 (Step A3 in FIG. 2A).

Next, the input data in Step A1, the key generated in Step A2, and the encrypted data generated in Step A3 are input to the registration auxiliary data generating unit 103 in the registration data generating device 100, and the registration auxiliary data generating unit 103 creates auxiliary data (Step A4 in FIG. 2A). The auxiliary data generated by the registration auxiliary data generating unit 103 is output to the one-way converting unit 104.

The one-way converting unit 104 in the registration data generating device 100 calculates post-conversion auxiliary data produced through one-way conversion performed on the auxiliary data, and outputs the auxiliary data to the registration auxiliary data generating unit 103 (Step A5 in FIG. 2A).

Next, the registration auxiliary data generating unit 103 in the registration data generating device 100 stores the post-conversion auxiliary data as input in Step A5 into the auxiliary data storage unit 203 in the storage device 200 (Step A6 in FIG. 2A).

When the above operations are completed, the input data in the storage device 200 can be assigned a unique identifier by the identifier managing unit 201 and can be later retrieved (read) with the assigned identifier.

In the encrypted text matching phase, first, an identifier is input to the identifier holding unit 401 in the specified data matching device 400. The encrypted data (registered encrypted data) corresponding to the input identifier is input from the encrypted text storage unit 202 in the storage device 200 to the encrypted text subtracting unit 402 in the specified data matching device 400. In addition, the auxiliary data corresponding to the input identifier is input from the auxiliary data storage unit 203 in the storage device 200 to the matching determining unit 403 in the specified data matching device 400 (Step B1 in FIG. 2B).

Next, input data (data to be matched) is input to the encrypting unit 301 in the data concealing device 300 (Step B2 in FIG. 2B).

Next, the key generating unit 302 in the data concealing device 300 generates a key to be used for concealing the input data and outputs the created key to the encrypting unit 301 in the data concealing device 300 and to the auxiliary data generating unit 303 (Step B3 in FIG. 2B).

Next, the encrypting unit 301 in the data concealing device 300 calculates encrypted data that is obtained by encrypting the input data using the input data in Step B2 and the key in Step B3, and then inputs the encrypted data into the encrypted text subtracting unit 402 in the specified data matching device 400 (Step B4 in FIG. 2B).

The auxiliary data generating unit 303 in the data concealing device 300 generates auxiliary data from input data and encrypted data that is obtained by encrypting the input data in the encrypting unit 301 (Step B5 in FIG. 2B).

The encrypted text subtracting unit 402 in the specified data matching device 400, after receiving encrypted texts, as inputs, from the encrypted text storage unit 202 in the storage device 200 and from the encrypting unit 301 in the data concealing device 300, outputs the difference between the two input pieces of encrypted data to the matching determining unit 403 in the specified data matching device 400 (Step B6 in FIG. 2B). In addition, the auxiliary data from the auxiliary data storage unit 203 in the storage device 200 and the auxiliary data from the auxiliary data generating unit 303 in the data concealing device 300 are input to the matching determining unit 403 in the specified data matching device 400, through communications in concert between the auxiliary data storage unit 203 in the storage device 200 and the auxiliary data generating unit 303 in the data concealing device 300 under the control of the control unit 404 in the specified data matching device 400.

The matching determining unit 403 in the specified data matching device 400, which has received, as an input, the difference between two pieces of encrypted data from the encrypted text subtracting unit 402 in the specified data matching device 400, and has received, as inputs, the post-conversion auxiliary data from the auxiliary data storage unit 203 in the storage device 200 and the auxiliary data from the auxiliary data generating unit 303 in the data concealing device 300 in Step B6, generates intermediate data from the difference between the two pieces of encrypted data and from the auxiliary data, and then outputs the intermediate data to the one-way converting unit 405 in the specified data matching device 400 (Step B7 in FIG. 2B).

The one-way converting unit 405 in the specified data matching device 400 generates post-conversion intermediate data produced through one-way conversion performed on the intermediate data, and outputs the post-conversion intermediate data to the matching determining unit 403 in the specified data matching device 400 (Step B8 in FIG. 2B).

The matching determining unit 403 in the specified data matching device 400 determines, from the post-conversion intermediate data and the auxiliary data, whether the Hamming distance between the plaintext of the encrypted data that has been input to the encrypted text subtracting unit 402 in the specified data matching device 400 in Step B1 and the plaintext of the encrypted data that has been input to the encrypted text subtracting unit 402 in the specified data matching device 400 in Step B4 is equal to or less than a predetermined certain value, and outputs the determination result (Step B9 in FIG. 2B).

Note that the devices 100, 200, 300, and 400 shown in FIG. 1 may be implemented on a single computer system, or may be configured as individual devices. Alternatively, the units in each of the devices 100, 200, 300, and 400 may be configured in the form of individual devices. Processes handled by individual units in individual devices shown in FIG. 1 may be implemented by a program to be executed by a computer. According to the present invention, a recording medium (semiconductor memory or a magnetic/optical disk) that records such program is provided.

Exemplary Embodiment 2

An exemplary embodiment 2 of the present invention will be described. In the encrypted text matching system according to the above-described exemplary embodiment 1, input data and an identifier are input to the system, and the input data is matched with the plaintext of the encrypted data corresponding to the identifier, while in the present exemplary embodiment, in contrast, input data is only input to the system, which outputs an identifier corresponding to the encrypted data to be matched with the input data.

Figure 3:
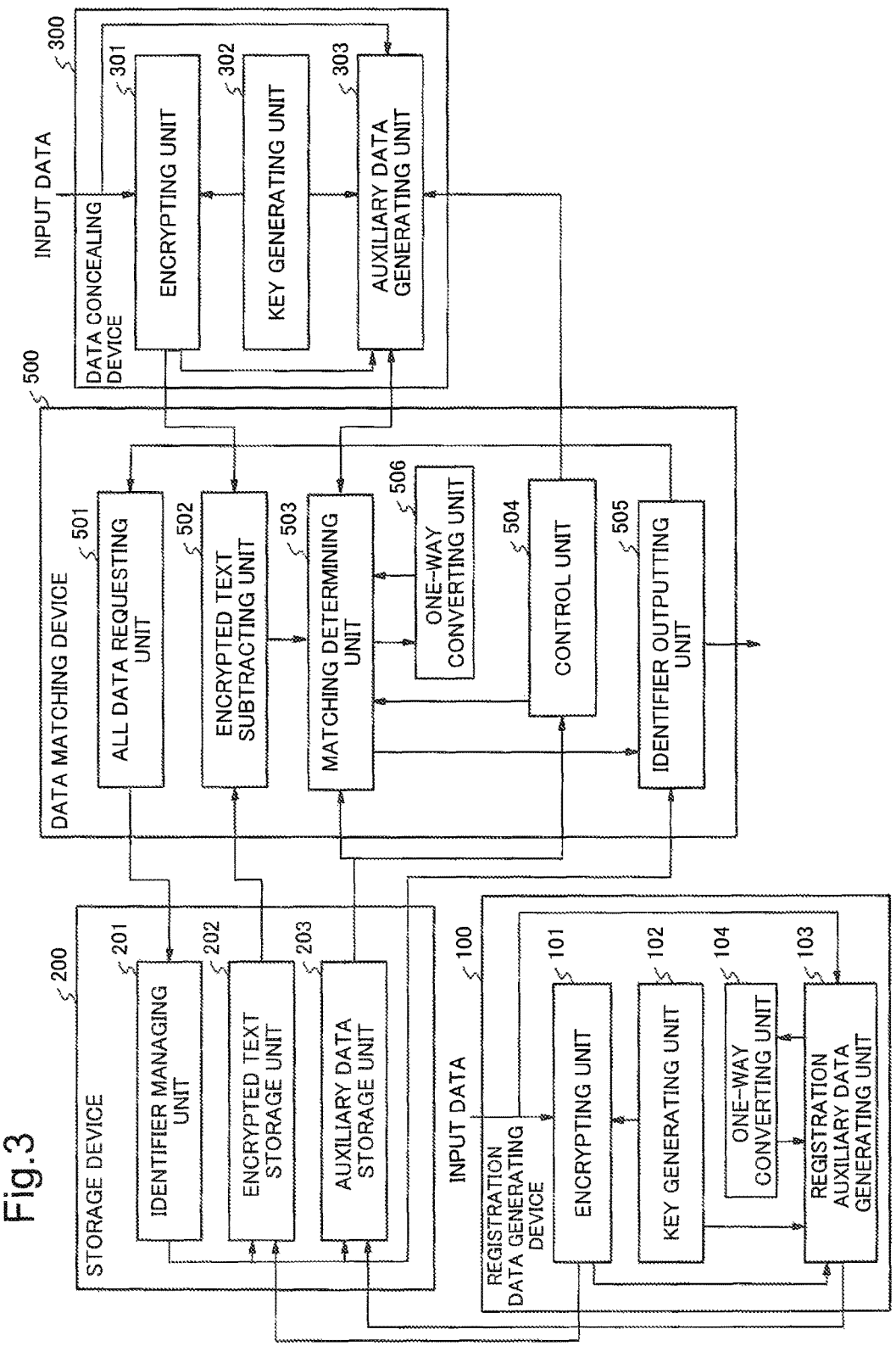
FIG. 3 is a diagram illustrating an example configuration according to an exemplary embodiment 2 of the present invention.

With reference to FIG. 3, the system according to the exemplary embodiment 2 is composed of a registration data generating device 100, a storage device 200, a data concealing device 300, and a data matching device 500. While the registration data generating device 100, the storage device 200, and the data concealing device 300 are configured in the same way as in the exemplary embodiment 1, the configuration of the data matching device 500 is different from that of the exemplary embodiment 1.

The data matching device 500 includes an all data requesting unit 501, an encrypted text subtracting unit 502, a matching determining unit 503, a control unit 504, an identifier outputting unit 505, and a one-way converting unit 506.

In accordance with an instruction given by the identifier outputting unit 505, the all data requesting unit 501 inputs into the identifier managing unit 201 an instruction for sequentially reading every piece of data stored in the storage device 200.

The encrypted text subtracting unit 502 receives, as inputs, one piece of the encrypted data stored in the encrypted text storage unit 202 in the storage device 200 and the encrypted data output from the encrypting unit 301 in the data concealing device 300, and then outputs a difference, c1−c2, between the two pieces of input encrypted data c1 and c2.

Owing to the properties of the encrypting units 101 and 301, the difference c1−c2 is expressed as follows:
let c1 be the encrypted text obtained by encrypting the input data m1 with the key k1; and
let c2 be the encrypted text obtained by encrypting the input data m2 with the key k2; then
the difference c1−c2 between the two encrypted texts c1 and c2 is the encrypted text obtained by encrypting the input data m1−m2 with the key k1−k2.

The matching determining unit 503 receives:
the auxiliary data stored in the auxiliary data storage unit 203 in the storage device 200;
the auxiliary data output from the auxiliary data generating unit 303 in the data concealing device 300; and
the difference between two pieces of encrypted data output from the encrypted text subtracting unit 502,
as inputs. The matching determining unit 503 transmits intermediate data generated from the data that includes at least:
the auxiliary data output from the auxiliary data generating unit 303 in the data concealing device 300; and
the difference between the two pieces of encrypted data output from the encrypted text subtracting unit 502
to the one-way converting unit 505.

The one-way converting unit 505 returns the result of one-way conversion performed on the intermediate data to the matching determining unit 503.

The matching determining unit 503 outputs a determination, from:
the data generated through one-way conversion performed by the one-way converting unit 505 based on the intermediate data; and
the auxiliary data that was subjected to one-way conversion and stored in the auxiliary data storage unit 203 in the storage device 200,
of whether the Hamming distance between plaintexts m1 and m2, which respectively correspond to the encrypted data c1 and c2, as input to the encrypted text subtracting unit 502 is equal to or less than a predetermined certain value.

The control unit 504 controls communications for exchanging data between the data concealing device 300 and the data matching device 500.

The identifier outputting unit 505 receives:
the identifier for which the identifier managing unit 201 has issued an instruction to the encrypted text storage unit 202 and the auxiliary data storage unit 203 to output the corresponding data; and
the matching result output from the matching determining unit 503,
as inputs, and, if the matching determining unit 503 determines that there is a match (agreement), outputs the identifier that has been input from the identifier managing unit 201.

Operations of the exemplary embodiment 2 will be described with reference to the flowchart in FIG. 4. The operations are broadly divided into two phases: a data registration phase and an encrypted text matching phase. In the data registration phase, input data is input to the registration data generating device 100, encrypted, and registered with the storage device 200 along with auxiliary data, on the other hand, in the encrypted text matching phase, the input data in to the data concealing device 300 is encrypted and then an identifier is output, the identifier being corresponding to the encrypted data stored in the storage device 200 that represents a plaintext being close (whose Hamming distance is small) to the encrypted data and the auxiliary data generated in the encryption process. Operations in the data registration phase are the same as those described for the exemplary embodiment 1 and thus their descriptions are omitted here.

Figure 4:
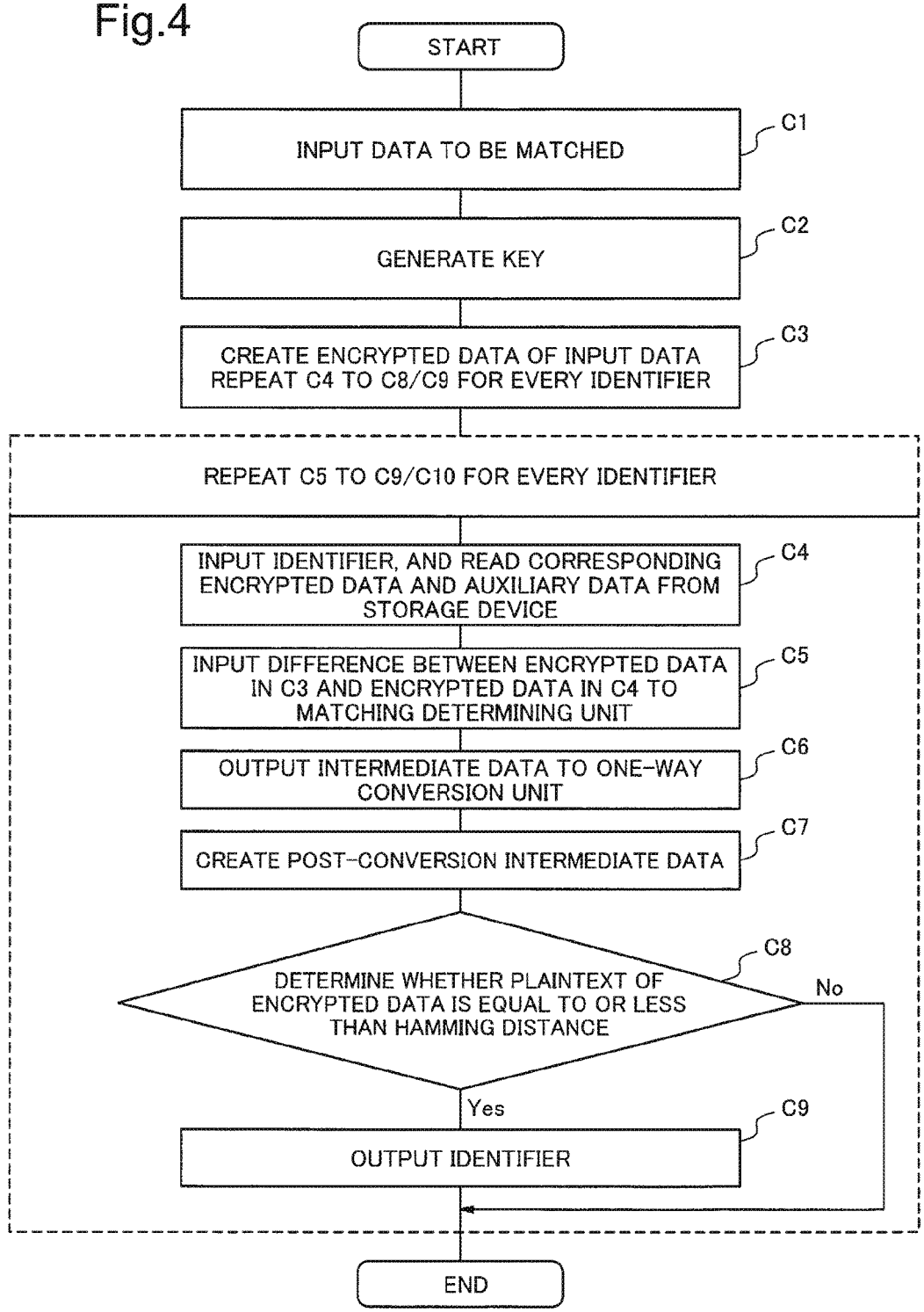
FIG. 4 is a diagram describing an encrypted text matching phase according to the exemplary embodiment 2 of the present invention.
Figure 5:
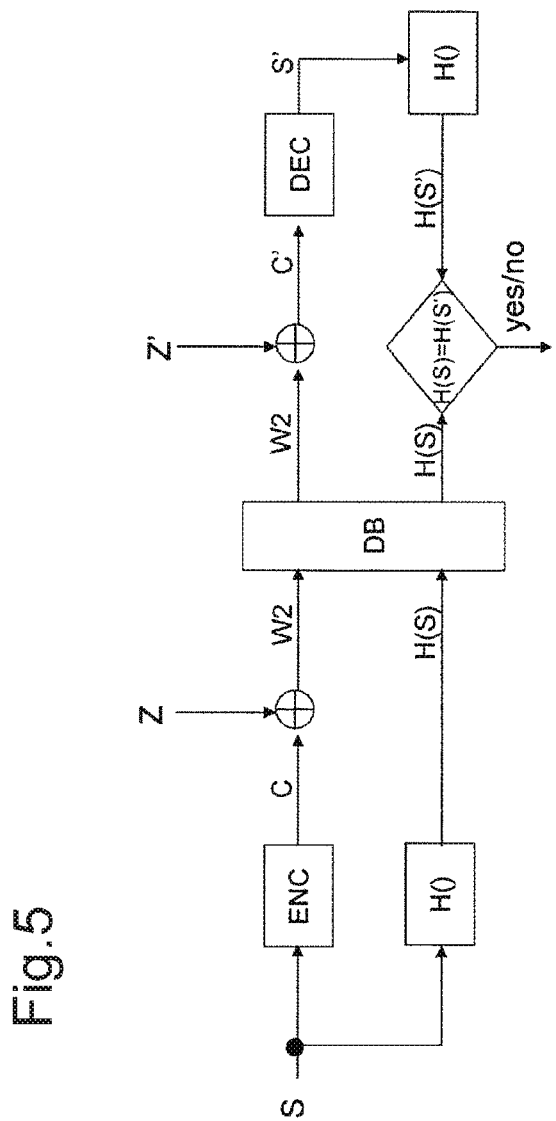
FIG. 5 is a diagram illustrating an example method according to NPL 1.

In the encrypted text matching phase, first, the input data is input to the encrypting unit in the data concealing device 300 (Step C1 in FIG. 4).

Next, the key generating unit 302 in the data concealing device 300 generates a key to be used for concealing the input data and outputs the key to the encrypting unit 301 in the data concealing device 300 and to the auxiliary data generating unit 303 (Step C2 in FIG. 4).

Then, the encrypting unit 301 in the data concealing device 300 calculates encrypted data that is obtained by encrypting the input data using the input data in Step C1 and the key in Step C2, and then inputs the encrypted data into the encrypted text subtracting unit 502 in the data matching device 500 (Step C3 in FIG. 4).

Next, the all data requesting unit 501 in the data matching device 500 inputs an identifier to the identifier managing unit 201 in the storage device 200. The encrypted data corresponding to the input identifier is input from the encrypted text storage unit 202 in the storage device 200 to the encrypted text subtracting unit 502 in the data matching device 500. In addition, the auxiliary data corresponding to the input identifier is input to the matching determining unit 503 from the auxiliary data storage unit 203 in the storage device 200 (Step C4 in FIG. 4).

The encrypted text subtracting unit 502 in the data matching device 500, after receiving encrypted texts as inputs from the encrypted text storage unit 202 in the storage device 200 and from the encrypting unit 301 in the data concealing device 300, outputs the difference between the two input pieces of encrypted data to the matching determining unit 503 in the data matching device 500 (Step C5 in FIG. 4).

Next, the auxiliary data from the auxiliary data storage unit 203 in the storage device 200 and the auxiliary data from the auxiliary data generating unit 303 in the data concealing device 300 are input to the matching determining unit 503 in the data matching device 500, through communications in concert between the auxiliary data storage unit 203 in the storage device 200 and the auxiliary data generating unit 303 in the data concealing device 300 under the control of the control unit 504 in the data matching device 500. The matching determining unit 503 in the data matching device 500, which has received, as an input, the difference between two pieces of encrypted data from the encrypted text subtracting unit 502 in the data matching device 500, and has received, as inputs, the post-conversion auxiliary data from the auxiliary data storage unit 203 in the storage device 200 and the auxiliary data from the auxiliary data generating unit 303 in the data concealing device 300, generates intermediate data from the difference between the two pieces of encrypted data and from the auxiliary data, and then outputs the intermediate data to the one-way converting unit 506 in the data matching device 500 (Step C6 in FIG. 4).

Upon receipt of the intermediate data output from the matching determining unit 503 in the data matching device 500, the one-way converting unit 506 in the data matching device 500 generates post-conversion intermediate data produced through one-way conversion performed on the intermediate data, and outputs the post-conversion intermediate data to the matching determining unit 503 in the data matching device 500 (Step C7 in FIG. 4).

The matching determining unit 503 in the data matching device 500 determines, based on the post-conversion intermediate data output from the one-way converting unit 506 in the data matching device 500 and on the auxiliary data from the auxiliary data generating unit 303 in the data concealing device 300, whether the Hamming distance between the plaintext of the encrypted data that has been input to the encrypted text subtracting unit 502 in the data matching device 500 in Step C1 and the plaintext of the encrypted data that has been input to the encrypted text subtracting unit 502 in the data matching device 500 in Step C4 is equal to or less than a predetermined certain value (Step C8 in FIG. 4).

If the result confirms the matching in Step C8, the identifier outputting unit 505 in the data matching device 500 outputs the identifier that has been input to the identifier managing unit 201 in the storage device 200 in Step C4 (Step C9 in FIG. 4).

The processes from Step C4 to Step C9 are repeated for every identifier (corresponding to encrypted data and auxiliary data) that is stored in the storage device 200 and managed by the identifier managing unit 201 in the storage device 200.

Note that the devices 100, 200, 300, and 500 shown in FIG. 3 may be implemented on a single computer system, or may be configured as individual devices. Alternatively, the units in each of the devices 100, 200, 300, and 400 may be configured in the form of individual devices. Processes handled by individual units in individual devices shown in FIG. 1 may be implemented by a program to be executed by a computer. According to the present invention, a recording medium (semiconductor memory or a magnetic/optical disk) that records such program is provided. The exemplary embodiments are further described below with reference to more specific examples.

Example 1

An example 1 of the present invention will be described in detail with reference to FIG. 1. The example 1 is a specific example of the exemplary embodiment 1.

In the data registration phase, first, an N-bit binary string Z is input to the encrypting unit 101 in the registration data generating device 100.

Then, the key generating unit 102 in the registration data generating device 100 generates a key (a K-bit random number) S and outputs the key to the encrypting unit 101 and to the registration auxiliary data generating unit 103.

Next, the encrypting unit 101 calculates N-bit encrypted data W1 (the following equation (1)), which is obtained by calculating an exclusive OR between an N-bit code word C obtained by encoding the input K-bit key S with a binary BCH code, and the N-bit input data Z, and then stores the encrypted data in the encrypted text storage unit 202 in the storage device 200.

$$W1 = C(+)Z \tag{1}$$

In the above equation, (+) represents a bitwise exclusive OR. It is assumed that the binary BCH code used here is a code that inputs K-bit data and outputs N-bit data (where N>K) and guarantees that a Hamming distance between any different code words is at least d.

Next, the input data Z, the key S, and the encrypted data W1 are input to the registration auxiliary data generating unit 103, which in turn calculates auxiliary data W2, through, for example, the one-way converting unit 104, in accordance with the following equation (2).

$$W2=h((c,S)(+)h(W1,R)) \quad (2)$$

In the above equation (2), c is a K-bit constant;

R is an N-bit random number (data less likely to be used repeatedly);

(c, S) represents an inner product, that is, (A, B) represents an inner product of A and B, where two pieces of K=(m*k)-bit data A and B are regarded as vectors into which A and B are divided in units of k bits (it is assumed that the calculation is performed on a Galois extension field GF $(2^k)$);

(+) represents a bitwise exclusive OR; and h is a cryptographic hash function (a one-way hash function such as SHA-256) which generates k-bit output data.

H(x, y, z) is defined here as a function represented by the following equation (3).

$$H(x,y,z)=(c,x)(+)h(y,z) \quad (3)$$

H(x, y, z) satisfies the following equation (4).

$$H(a1,b1,c1)(+)H(a2,b2,c2)=H(a1(+)a2,b1,c1)(+)h(b2,c2) \quad (4)$$

In addition, for a random number r of (K−k) bits, letting C3 be the code word data that is obtained through error-correcting coding with a BCH code applied to:

$$h(W1,N)\|r \quad (5)$$

(where ∥ is an operation symbol representing concatenation of bits), the registration auxiliary data generating unit 103 calculates auxiliary data W3 from C3 and Z in accordance with the following equation (6).

$$W3=C3(+)Z \quad (6)$$

The registration auxiliary data generating unit 103 registers, as auxiliary data, the pair (W2, W3) as obtained in accordance with the above equations (2) and (6) with the auxiliary data storage unit 203.

When the above operations are completed, the data input to the storage device 200 can be assigned a unique identifier by the identifier managing unit 201 and can be later retrieved with the assigned identifier.

The encrypted data W1, the auxiliary data W2, and the auxiliary data W3, which are associated with an identifier i, are hereinafter denoted as W1[i], W2[i], and W3[i], respectively.

In the encrypted text matching phase, first, an identifier i is input to the identifier holding unit 401 in the specified data matching device 400. The encrypted data W1[i] corresponding to the input identifier i is read from the encrypted text storage unit 202 in the storage device 200 and is input to the encrypted text subtracting unit 402. In addition, the auxiliary data W2[i] and the auxiliary data W3[i] corresponding to input identifier i are read from the auxiliary data storage unit 203 in the storage device 200 and are input to the matching determining unit 403 in the specified data matching device 400.

Next, N-bit binary string input data Z' (data to be matched) is input to the encrypting unit 301 in the data concealing device 300.

Next, the key generating unit 302 in the data concealing device 300 generates a key (a K-bit random number) S' to be used for concealing the input data Z', and outputs the key to the encrypting unit 301 and to the auxiliary data generating unit 303 in the data concealing device 300.

The encrypting unit 301 in the data concealing device 300 calculates encrypted data W1' (the following equation (7)), which is obtained by calculating an exclusive OR between the code word C', which is obtained through error-correcting coding with a binary BCH code applied to the key S' as input from the key generating unit 302, and the input data Z'. The encrypting unit 301 in the data concealing device 300 inputs the encrypted data W1' into the encrypted text subtracting unit 402 in the specified data matching device 400.

$$W1'=C'(+)Z' \quad (7)$$

The encrypted text subtracting unit 402 in the specified data matching device 400 receives, as inputs, the encrypted data W1' from the encrypting unit 301 in the data concealing device 300 and the encrypted data W1[i] corresponding to the identifier i from the encrypted text storage unit 202 in the storage device 200, and then calculates the difference (exclusive OR) (the following expression (8)) between the two pieces of input encrypted data W1' and W1[i]. The encrypted text subtracting unit 402 in the specified data matching device 400 outputs the calculated difference between the two pieces of encrypted data to the matching determining unit 403.

$$W1'(+)W1[i] \quad (8)$$

Next, for a random number ns and an element (generator) g of a predetermined group G, the control unit 404 in the specified data matching device 400 calculates the following:

$$g\_s=g^{**}ns \quad (9)$$

In the equation (9), gns represents the ns-th power of g on the group G ( is an exponentiation operator). Note that a group means a set with a binary operation·that abides by the following rules:

1. Associative law ((a·b)·c=a·(b·c) for ∀a, b, c∈G)
2. Existence of identity element (a·e=e·a=a for ∃ e∈G, ∀ a∈G)
3. Existence of inverse element (∃b∈G, a·b=b·a=e for ∀a∈G)

The group G is a cyclic group with respect to multiplication and is constituted of a multiplicative group Zp (=Z/pZ) of order p with a prime number p, and a value of g**ns is given by a remainder (mod p) of modulo a prime number p.

The control unit 404 in the specified data matching device 400 outputs W3[i] and g_s to the auxiliary data generating unit 303 in the data concealing device 300.

Next, the auxiliary data generating unit 303 in the data concealing device 300 applies the decrypting process of the binary BCH code to the value obtained by calculating an exclusive OR between W3[i] and the input data Z' (the following expression (10)) to obtain h', which is the decryption result.

$$W3[i](+)Z' \quad (10)$$

The auxiliary data generating unit 303 in the data concealing device 300 calculates W2' and g_c respectively, from the key S', the encrypted data W1', h', g, g_s, and the random number nc, based on the following equations (11a) and (11b), and then outputs the calculated values to the matching determining unit 403 in the specified data matching device 400.

$$W2'=H(S',W1',g\_s^{**}nc)(+)h' \quad (11a)$$

$$g\_c=g^{**}nc \quad (11b)$$

Next, the matching determining unit 403 in the specified data matching device 400 applies the decrypting process of the binary BCH code to the difference between two pieces of encrypted input data W1' and W1[i] (the following expression (12)) to calculate T, which is a result of decrypting the difference between the two pieces of encrypted data W1' and W1[i].

$$W1'(+)W1[i] \qquad (12)$$

Then, the one-way converting unit 405 in the specified data matching device 400 calculates a hash value of the result of an exclusive OR operation:

$$H(T,W1',g\_c**ns)(+)W2'$$

between H(T, W1', g_cns), which is obtained through calculation using T, W1', and g_cns, where T is a result of decrypting the difference between the two pieces of encrypted data W1' and W1[i], and W2', which is provided by the equation (11a).

$$h(H(T,W1',g\_c**ns)(+)W2') \qquad (13)$$

Next, the matching determining unit 403 in the specified data matching device 400 checks whether the hash value calculated in accordance with the expression (13) is equal to the auxiliary data W2[i]; in other words it checks whether the following equation (14) is satisfied.

$$W2[i]=h(H(T,W1,g\_c**ns)(+)W2') \qquad (14)$$

The matching determining unit 403 in the specified data matching device 400 determines that that the Hamming distance between the original data (plaintext) of W1[i] and the input data (plaintext) Z' is equal to or less than d if the equation (14) is satisfied. On the other hand, the matching determining unit 403 in the specified data matching device 400 determines that the Hamming distance between the original data (plaintext) of W1[i] and the input data (plaintext) Z' exceeds d if the equation (14) is not satisfied, and the determination result is output. Note that the above-described BCH coding assumes that a Hamming distance between any different code words exceeds at least d.

Both of the matching determining unit 403 in the specified data matching device 400 and the auxiliary data generating unit 303 in the data concealing device 300 may be configured to generate g_snc=(gns)nc) (=R') in the auxiliary data W2'=H(S', W1', g_snc) (+) h', which is generated by the auxiliary data generating unit 303 in the data concealing device 300; and g_cns (=(gnc)**ns) in the matching determining unit 403 in the specified data matching device 400, through the use of, for example, the known Diffie-Hellman key exchange method.

Example 2

An example 2 will be described in detail with reference to FIG. 3. The example 2 is a specific example of the exemplary embodiment 2.

In the data registration phase, first, an N-bit binary string Z is input to the encrypting unit 101 in the registration data generating device 100.

Then, the key generating unit 102 in the registration data generating device 100 generates a K-bit random number S and outputs the number to the encrypting unit 101 and to the registration auxiliary data generating unit 103.

Next, the encrypting unit 101 calculates encrypted data W1, which is obtained by calculating an exclusive OR between a code word C obtained by encoding the input key S with a binary BCH code, and the input data Z, and then stores the encrypted data in the encrypted text storage unit 202. It is assumed that the binary BCH code used here is a code that inputs K-bit data and outputs N-bit data and guarantees that a Hamming distance between any different code words is at least d.

Next, the input data Z, the key S, and the encrypted data W1 are input to the registration auxiliary data generating unit 103 in the registration data generating device 100. The registration auxiliary data generating unit 103 calculates auxiliary data W2, through the one-way converting unit 104, in accordance with the following equation (15).

$$W2=h((c,S)(+)h(W1,R)) \qquad (15)$$

In the above equation (15), c is a K-bit constant;

R is a random number (data less likely to be used repeatedly);

(A, B) represents an inner product of A and B, where two pieces of K=(m*k)-bit data A and B are regarded as vectors into which A and B are divided in units of k bits (it is assumed that the calculation is performed on a Galois extension field GF ($2^k$));

(+) represents a bitwise exclusive OR; and h is a cryptographic hash function which generates k-bit output data (for example, SHA-256).

H(x, y, z) is defined as a function represented by the equation (16) (the same as the equation (3) above).

$$H(x,y,z)=(c,x)(+)h(y,z) \qquad (16)$$

For a random number r of K-k bits, letting C3 be the code word data that is obtained by encoding:

$$h(W1,N)\|r \qquad (17)$$

(where ∥ is a symbol representing concatenation of bits) with a BCH code, the registration auxiliary data generating unit 103 in the registration data generating device 100 calculates the auxiliary data W3 from C3 and Z in accordance with the following equation (18):

$$W3=C3(+)Z \qquad (18)$$

The registration auxiliary data generating unit 103 registers, as auxiliary data, the pair (W2, W3) as generated above with the auxiliary data storage unit 203.

When the above operations are completed, the data input to the storage device 200 can be assigned a unique identifier by the identifier managing unit 201 and can be later retrieved with the assigned identifier. W1, W2, and W3, which are associated with an identifier i, are hereinafter denoted as W1[i], W2[i], and W3[i], respectively.

In the encrypted text matching phase, first, the input data Z' (data to be matched) is input to the encrypting unit 301 in the data concealing device 300.

Next, the key generating unit 302 in the data concealing device 300 generates a key S' (a K-bit random number) to be used for concealing the input data Z', and outputs the key to the encrypting unit 301 and to the auxiliary data generating unit 303 in the data concealing device 300.

The encrypting unit 301 in the data concealing device 300 calculates encrypted data W1' (the following equation (19)), which is obtained by calculating an exclusive OR between a code word C', which is obtained by encoding the input key S' with a binary BCH code, and the input data Z'.

$$W1'=C'(+)Z' \qquad (19)$$

The encrypting unit 301 in the data concealing device 300 inputs the calculated encrypted data W1' into the encrypted text subtracting unit 502 in the data matching device 500.

Next, the all data requesting unit 501 in the data matching device 500 inputs an identifier i to the identifier managing unit 201 in the storage device 200. The encrypted data W1[i]

corresponding to the input identifier i is read from the encrypted text storage unit 202 in the storage device 200 and is input to the encrypted text subtracting unit 502 in the data matching device 500. In addition, the auxiliary data W2[i] and the auxiliary data W3[i] corresponding to the identifier i are read from the auxiliary data storage unit 203 in the storage device 200, and then input to the matching determining unit 503 in the data matching device 500.

The encrypted text subtracting unit 502 in the data matching device 500, after receiving the encrypted data W1[i] from the encrypted text storage unit 202 in the storage device 200 and the encrypted data W1' from the encrypting unit 301 in the data concealing device 300, as inputs, outputs the difference between the two input pieces of encrypted data W1' and W1[i] (the following expression (20)) to the matching determining unit 503 in the data matching device 500.

$$W1'(+)W1[i] \tag{20}$$

Next, for a random number ns and an element g of a predetermined group G, the control unit 504 in the data matching device 500 calculates the following:

$$g\_s = g^{**}ns \tag{21}$$

and outputs the result to the auxiliary data generating unit 303 in the data concealing device 300.

Next, the auxiliary data generating unit 303 in the data concealing device 300 randomly selects S1' and S2', which satisfy:

$$S' = S1'(+)S2' \tag{22}$$

The auxiliary data generating unit 303 in the data concealing device 300 calculates W2' and g_c based on the following equations (23a) and (23b).

$$W2' = H(S1', W1', g\_s^{**}nc) \tag{23a}$$

$$g\_c = g^{**}nc \tag{23b}$$

Next, from C3, which is obtained through binary BCH error-correcting coding applied to the data concealing from concatenation of bits on an inner product (c, S2') and a random number r':

$$(c, S2') \| r' \tag{24}$$

and from Z', the auxiliary data generating unit 303 in the data concealing device 300 calculates the auxiliary data W3' in accordance with the following equation:

$$W3' = C3(+)Z' \tag{25}$$

and outputs W1', W2', W3' and g_c to the matching determining unit 503 in the data matching device 500.

Next, the matching determining unit 503 in the data matching device 500 applies the decrypting process of the binary BCH code to the difference between two pieces of input encrypted data:

$$W1'(+)W1[i] \tag{26}$$

to calculate T, which is a result of decrypting the difference between the two pieces of encrypted data W1 and W1[i].

In addition, the matching determining unit 503 in the data matching device 500 applies the decrypting process of the binary BCH code to the exclusive OR between the auxiliary data W3[i] and W3' (the equation (25)):

$$W3[i](+)W3' \tag{27}$$

to calculate w3, which is a result of decrypting the auxiliary data W3[i](+) W3'.

The matching determining unit 503 in the data matching device 500 outputs to the one-way converting unit 506 the result H(T, W1', g_cns), which is calculated by using T, which is a result of decrypting the difference between two pieces of encrypted data, and W1' and g_cns, as well as outputting W2' and w3.

The one-way converting unit 506 in the data matching device 500 calculates a hash value (the following expression (28)) of the result of a bitwise exclusive OR among H(T, W1', g_c**ns), W2', and w3:

$$H(T, W1', g\_c^{**}ns)(+)W2'(+)w3$$

where H(T, W1', g_cns) is obtained through calculation using T, which is a result of decrypting the difference between the two pieces of encrypted data, W1', and g_cns.

$$h(H(T, W1', g\_c^{**}ns)(+)W2'(+)w3) \tag{28}$$

The matching determining unit 503 in the data matching device 500 checks whether the value calculated in accordance with the expression (28) is equal to W2[i]; in other words it checks whether the equation (29) is satisfied.

$$W2[i] = h(H(T, W1', g\_c^{**}ns)(+)W2'(+)w3) \tag{29}$$

If the equation (29) is satisfied, the identifier outputting unit 505 in the data matching device 500 determines that the Hamming distance between the original data of W1[i] and Z' is equal to or less than d and outputs the identifier i. If the equation (29) is not satisfied, the identifier outputting unit 505 determines that the Hamming distance exceeds d and thus does not output the identifier i.

The above operations are repeated on every identifier i, which is managed by the storage device, to output every identifier for any original data whose Hamming distance to the input data Z' is equal to or less than d.

Similarly to the example 1, in the example 2, both of the matching determining unit 503 in the data matching device 500 and the auxiliary data generating unit 303 in the data concealing device 300 may be configured to generate *g_snc (=(gns)nc) (=R') in the auxiliary data W2'=H(S', W1', g_snc) (equation (23a)), which is generated by the auxiliary data generating unit 303 in the data concealing device 300 and g_cns (=(gnc)**ns) in the matching determining unit 503 in the data matching device 500, through the use of, for example, the known Diffie-Hellman key exchange method.

Example applications of the example 1 or 2 include authentication where biometric information is protected. The following outlines such authentication.

The input data in the data registration phase and the input data in the encrypted text matching phase may be biometric information obtained from fingerprints, veins, or the like. In this case, while the biometric information remains concealed (encrypted), it can be determined whether the encrypted biometric data stored in the storage device and the encrypted biometric data transmitted from the data concealing device have been taken from the same person, depending on whether the Hamming distance between the two pieces of input data is equal to or less than a predetermined certain value, thereby achieving authentication. Concerning biometric information, the same data may not always be obtained steadily. However, it can be assumed that pieces of data obtained from the same person are similar to one another (a Hamming distance between two pieces of such data is small). Therefore, the present invention is regarded as suitable for application to, for example, biometric authentication (however, it should be noted that the application is not limited to biometric authentication).

The respective disclosures of the patent and non-patent literatures described above are incorporated herein by reference. Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective examples, respective elements of the respective drawings, and the like) are possible within the bounds of the claims of the present invention. That is, the present invention clearly includes every type of transformation and modification that a person skilled in the art can realize according to the entire disclosure of the present invention including the claims and to technological concepts thereof.

REFERENCE SIGNS LIST

10 Encrypted text matching system (device)
11, 12 Encrypting means (unit)
13 Storage device
14 Auxiliary data generating means (unit)
14h, 15h One-way converting means (unit)
15 Matching determining means (unit)
100, 100' Registration data generating device
101 Encrypting unit
102 Key generating unit
103 Registration auxiliary data generating unit
104 One-way converting unit
200 Storage device
201 Identifier managing unit
202 Encrypted text storage unit
203 Auxiliary data storage unit
300, 300' Data concealing device
301 Encrypting unit
302 Key generating unit
303 Auxiliary data generating unit
400 Specified data matching device
401 Identifier holding unit
402 Encrypted text subtracting unit
403 Matching determining unit
404 Control unit
405 One-way converting unit
500 Data matching device
501 All data requesting unit
502 Encrypted text subtracting unit
503 Matching determining unit
504 Control unit
505 Identifier outputting unit
506 One-way converting unit

The invention claimed is:
1. An encrypted text matching system comprising:
an auxiliary data generating unit configured to generate first auxiliary data and second auxiliary data to verify matching between a first encrypted text that is obtained by encrypting input data and is registered with a storage device and a second encrypted text that is obtained by encrypting input data to be matched, the verification being performed by using a Hamming distance between plaintexts,
a matching determining unit configured to:
perform one-way conversion on at least part of the first auxiliary data,
perform one-way conversion on intermediate data that is generated based on a difference between the first encrypted text and the second encrypted text and on the second auxiliary data,
and determine, by using a result of the one-way conversion performed on the intermediate data as well as using the first auxiliary data that underwent the one-way conversion, whether a Hamming distance between plaintexts is equal to or less than a predetermined certain value, the Hamming distance corresponding to the difference between the first encrypted text and the second encrypted text,
wherein the encrypted text matching system further comprises a registration data generating device, a data concealing device, a specified data matching device and a storage device,
wherein the encrypted text matching system performs biometric authentication by:
generating, based on biometric information, input data to be input to the registration data generating device and to the data concealing device, and
determining whether data input to the specified data matching device via the data concealing device matches data stored in the storage device,
wherein the registration data generating device comprises:
a first encrypting unit which receives fixed-length input data and a key, as inputs, and outputs an encrypted text that is obtained by encrypting the input data with the key,
the encrypted text satisfying a relationship where the sum of an encrypted text 1 obtained by encrypting a plaintext 1 with a key 1 and an encrypted text 2 obtained by encrypting a plaintext 2 with a key 2 is equal to an encrypted text obtained by encrypting the sum of the plaintext 1 and the plaintext 2 with the sum of the key 1 and the key 2;
a first key generating unit which generates the key to be input to the first encrypting unit; and
a registration auxiliary data generating unit which receives the input data and the key generated by the first key generating unit, as inputs, and outputs the first auxiliary data for verifying that a Hamming distance between a plaintext of the first encrypted text output from the first encrypting unit and a plaintext of the second encrypted text output from the data concealing device is equal to or less than a predetermined certain value,
a one-way converting unit which outputs data obtained through one-way conversion on at least part of the first auxiliary data output from the registration auxiliary data generating unit,
and wherein the storage device comprises:
an encrypted text storage unit which stores one or more of the first encrypted texts output from the first encrypting unit in the registration data generating device;
an auxiliary data storage unit which stores one or more pieces of the first auxiliary data output from the registration auxiliary data generating unit in the registration data generating device; and
an identifier managing unit which receives an identifier, as an input, from the specified data matching device and causes the encrypted text storage unit and the auxiliary data storage unit to output the encrypted text and the first auxiliary data that correspond to the identifier, respectively, and wherein the data concealing device comprises:
  a second encrypting unit which receives fixed-length input data and a key, as inputs, and outputs an encrypted text that is obtained by encrypting the input data with the key, the encrypted text satisfying a relationship where the sum of an encrypted text 1 obtained by encrypting a plaintext 1 with a key 1 and an encrypted text 2 obtained by encrypting a plaintext 2 with a key 2 is equal to an encrypted text obtained by encrypting the sum of the plaintext 1 and the plaintext 2 with the sum of the key 1 and the key 2;
  a second key generating unit which generates the key to be input to the second encrypting unit; and
  an auxiliary data generating unit which receives the input data and the key generated by the second key generating unit, as inputs, and outputs the second auxiliary data for verifying that a Hamming distance between a plaintext of the second encrypted text output from the second encrypting unit and a plaintext of the first encrypted text output from the first encrypting unit in the registration data generating device is equal to or less than a predetermined certain value,
and wherein the specified data matching device comprises:
  an identifier holding unit which receives an identifier, as an input, outputs the identifier to the identifier managing unit in the storage device, and instructs the identifier managing unit to output the encrypted text and the auxiliary data that correspond to the identifier;
  an encrypted text subtracting unit which receives the first encrypted text output from the second encrypting unit in the data concealing device and the encrypted text read from the encrypted text storage unit in the storage device, as inputs, and outputs a difference between the input two encrypted texts;
  a matching determining unit which receives:
    the difference between the first and second encrypted texts, the difference being output from the encrypted text subtracting unit;
    the first auxiliary data read from the auxiliary data storage unit in the storage device; and
    the second auxiliary data output from the auxiliary data generating unit in the data concealing device, as inputs,
    transmits to a one-way converting unit intermediate data which is generated based on the difference between the first and second encrypted texts output from the encrypted text subtracting unit and on the second auxiliary data output from the auxiliary data generating unit in the data concealing device, and
    determines whether a Hamming distance between plaintexts corresponding to the difference between the first and second encrypted texts is equal to or less than a predetermined certain value, by determining whether post-one-way conversion data generated by the one-way converting unit based on the intermediate data is equal to one piece of the first auxiliary data that underwent one-way conversion and is stored in the auxiliary data storage unit in the storage device;
  the one-way converting unit which receives, as an input, the intermediate data calculated by the matching determining unit and outputs a result of one-way conversion performed on the intermediate data; and
  a control unit which controls data exchanges between the data concealing device and the specified data matching device.

2. The encrypted text matching system according to claim 1,
  wherein the encrypted text is a result of an exclusive OR operation between a code word, which is obtained by encoding a key for encrypting the plaintext of the input data with an error-correcting code having linearity, and the plaintext,
  and wherein the system calculates each of the first auxiliary data and the second auxiliary data that are related to the encrypted text registered with the storage device and the encrypted text of the input data to be matched, respectively, based on a result of one-way conversion on an exclusive OR between an inner product of the corresponding key and a constant, and an output of a cryptographic hash function for a bit string that is based on the corresponding encrypted text.

3. The encrypted text matching system according to claim 1, wherein, for the key and the plaintext of the input data, each of the first and second encrypting units encodes the key with an error-correcting code having linearity and outputs, as the encrypted text, a result of calculating a vectorial sum of a code word, which is an encoded result of error-correcting coding, and the plaintext.

4. The encrypted text matching system according to claim 1,
  wherein the first auxiliary data output from the registration auxiliary data generating unit in the registration data generating device comprises:
    data that is calculated according to the following equation:
    letting S be a key that is input to the first encrypting unit in the registration data generating device;
    letting W1 be an encrypted text that is output from the first encrypting unit; and
    letting R be data that is less likely to be repeatedly used, $$h((c,S)(+)h(W1,R)),$$

wherein c is a constant; (x, y) represents an inner product of vectors x and y, and (c, S) is an inner product of c and S; h is a cryptographic hash function; and (+) represents a bitwise exclusive OR, and
  wherein the second auxiliary data output from the auxiliary data generating unit in the data concealing device comprises:
    data that is calculated according to the following equation:
    letting S' be a key that is input to the second encrypting unit in the data concealing device;
    letting W1' be an encrypted text that is output from the second encrypting unit; and
    letting R' be data that is less likely to be repeatedly used, $$(c,S')(+)h(W1',R').$$

5. The encrypted text matching system according to claim 4, wherein the R' is generated by both of the matching determining unit in the specified data matching device or in the data matching device and the auxiliary data generating unit in the data concealing device through the use of a Diffie-Hellman key exchange method.

6. A method for matching encrypted texts performed by an encrypted text matching system, the method comprising:

generating, based on biometric information, input data to be input to a registration data generating device and to a data concealing device, and determining whether data input to the specified data matching device via a data concealing device matches data stored in a storage device, wherein the matching comprises;

generating first auxiliary data and second auxiliary data, respectively, to verify matching between a first encrypted text that is obtained by encrypting input data and is registered with the storage device and a second encrypted text that is obtained by encrypting input data to be matched, the verification being performed by using a Hamming distance between plaintexts;

performing one-way conversion on at least part of the first auxiliary data, performing one-way conversion on intermediate data that is generated based on a difference between the first encrypted text and the second encrypted text and on the second auxiliary data, and determining, by using a result of the one-way conversion performed on the intermediate data as well as using the first auxiliary data that underwent the one-way conversion, whether a Hamming distance between plaintexts is equal to or less than a predetermined certain value, the Hamming distance corresponding to the difference between the first encrypted text and the second encrypted text, receiving, by a first encrypting unit of the registration data generating device, fixed-length input data and a key, as inputs, and outputs an encrypted text that is obtained by encrypting the input data with the key, outputting, by the first encrypting unit of the registration data generating device, the encrypted text satisfying a relationship where the sum of an encrypted text 1 obtained by encrypting a plaintext 1 with a key 1 and an encrypted text 2 obtained by encrypting a plaintext 2 with a key 2 is equal to an encrypted text obtained by encrypting the sum of the plaintext 1 and the plaintext 2 with the sum of the key 1 and the key 2;

generating, by a first key generating unit of the registration data generating device, the key to be input to the first encrypting unit;

receiving, by a registration auxiliary data generating unit of the registration data generating device, the input data and the key generated by the first key generating unit, as inputs;

outputting, by the registration auxiliary data generating unit of the registration data generating device, the first auxiliary data for verifying that a Hamming distance between a plaintext of the first encrypted text output from the first encrypting unit and a plaintext of the second encrypted text output from the data concealing device is equal to or less than a predetermined certain value;

outputting, by a one-way converting unit of the registration data generating device, data obtained through one-way conversion on at least part of the first auxiliary data output from the registration auxiliary data generating unit;

storing, by an encrypted text storage unit of the storage device, one or more of the first encrypted texts output from the first encrypting unit in the registration data generating device;

storing, by an auxiliary data storage unit of the storage device, one or more pieces of the first auxiliary data output from the registration auxiliary data generating unit in the registration data generating device;

receiving, by an identifier managing unit of the storage device, an identifier, as an input, from the specified data matching device;

causing, by the identifier managing unit of the storage device, the encrypted text storage unit and the auxiliary data storage unit to output the encrypted text and the first auxiliary data that correspond to the identifier, respectively;

receiving, by a second encrypting unit of the data concealing device, fixed-length input data and a key, as inputs;

outputting, by the second encrypting unit of the data concealing device, an encrypted text that is obtained by encrypting the input data with the key, the encrypted text satisfying a relationship where the sum of an encrypted text 1 obtained by encrypting a plaintext 1 with a key 1 and an encrypted text 2 obtained by encrypting a plaintext 2 with a key 2 is equal to an encrypted text obtained by encrypting the sum of the plaintext 1 and the plaintext 2 with the sum of the key 1 and the key 2;

generating, by a second key generating unit of the data concealing device, the key to be input to the second encrypting unit;

receiving, by an auxiliary data generating unit of the data concealing device, the input data and the key generated by the second key generating unit, as inputs;

outputting, by the auxiliary data generating unit of the data concealing device, the second auxiliary data for verifying that a Hamming distance between a plaintext of the second encrypted text output from the second encrypting unit and a plaintext of the first encrypted text output from the first encrypting unit in the registration data generating device is equal to or less than a predetermined certain value;

receiving, by an identifier holding unit of the specified data matching device, an identifier, as an input;

outputting, by the identifier holding unit of the specified data matching device, the identifier to the identifier managing unit in the storage device;

instructing, by the identifier holding unit of the specified data matching device, the identifier managing unit to output the encrypted text and the auxiliary data that correspond to the identifier;

receiving, by an encrypted text subtracting unit of the specified data matching device, the first encrypted text output from the second encrypting unit in the data concealing device and the encrypted text read from the encrypted text storage unit in the storage device, as inputs;

outputting, by the encrypted text subtracting unit of the specified data matching device, a difference between the input two encrypted texts;

receiving as inputs, by a matching determining unit:
the difference between the first and second encrypted texts, the difference being output from the encrypted text subtracting unit;
the first auxiliary data read from the auxiliary data storage unit in the storage device; and
the second auxiliary data output from the auxiliary data generating unit in the data concealing device, transmitting to a one-way converting unit, by the matching determining unit, intermediate data which is generated based on the difference between the first and second encrypted texts output from the encrypted text subtracting unit and on the second auxiliary data output from the auxiliary data generating unit in the data concealing device, and determining, by the matching determining unit, whether a Hamming distance between plaintexts corresponding to the difference between the first and second encrypted texts is equal to or less than a predetermined certain value, by determining whether post-one-way conversion data generated by the one-way converting unit based on the intermediate data is equal to one piece of the first auxiliary data that underwent one-way conversion and is stored in the auxiliary data storage unit in the storage device;

receiving, by the one-way converting unit, as an input, the intermediate data calculated by the matching determining unit;

outputting a result of one-way conversion performed on the intermediate data; and controlling, by a control unit, data exchanges between the data concealing device and the specified data matching device.

7. A non-transitory computer readable medium storing a program causing a computer to execute:

a process which generates, based on biometric information, input data to be input to a registration data generating device and to a data concealing device, and a process which determines whether data input to the specified data matching device via a data concealing device matches data stored in a storage device, wherein the matching comprises:

a process which generates first auxiliary data and second auxiliary data, respectively, to verify, with respect to a first encrypted text that is obtained by encrypting input data and is registered with the storage device and a second encrypted text that is obtained by encrypting input data to be matched, that a Hamming distance between plaintexts corresponding to the first encrypted text and the second encrypted text is equal to or less than a predetermined certain value;

a process which performs one-way conversion on at least part of the first auxiliary data, performs one-way conversion on intermediate data that is generated based on a difference between the first encrypted text and the second encrypted text and on the second auxiliary data, and determines, by using a result of the one-way conversion performed on the intermediate data as well as using the first auxiliary data that underwent the one-way conversion, whether a Hamming distance between plaintexts is equal to or less than a predetermined certain value, the Hamming distance corresponding to the difference between the first encrypted text and the second encrypted text;

a process which receives, by a first encrypting unit of the registration data generating device, fixed-length input data and a key, as inputs, and outputs an encrypted text that is obtained by encrypting the input data with the key, a process which outputs, by the first encrypting unit of the registration data generating device, the encrypted text satisfying a relationship where the sum of an encrypted text 1 obtained by encrypting a plaintext 1 with a key 1 and an encrypted text 2 obtained by encrypting a plaintext 2 with a key 2 is equal to an encrypted text obtained by encrypting the sum of the plaintext 1 and the plaintext 2 with the sum of the key 1 and the key 2;

a process which generates, by a first key generating unit of the registration data generating device, the key to be input to the first encrypting unit;

a process which receives, by a registration auxiliary data generating unit of the registration data generating device, the input data and the key generated by the first key generating unit, as inputs;

a process which outputs, by the registration auxiliary data generating unit of the registration data generating device, the first auxiliary data for verifying that a Hamming distance between a plaintext of the first encrypted text output from the first encrypting unit and a plaintext of the second encrypted text output from the data concealing device is equal to or less than a predetermined certain value;

a process which outputs, by a one-way converting unit of the registration data generating device, data obtained through one-way conversion on at least part of the first auxiliary data output from the registration auxiliary data generating unit;

a process which stores, by an encrypted text storage unit of the storage device, one or more of the first encrypted texts output from the first encrypting unit in the registration data generating device;

a process which stores, by an auxiliary data storage unit of the storage device, one or more pieces of the first auxiliary data output from the registration auxiliary data generating unit in the registration data generating device;

a process which receives, by an identifier managing unit of the storage device, an identifier, as an input, from the specified data matching device;

a process which causes, by the identifier managing unit of the storage device, the encrypted text storage unit and the auxiliary data storage unit to output the encrypted text and the first auxiliary data that correspond to the identifier, respectively;

a process which receives, by a second encrypting unit of the data concealing device, fixed-length input data and a key, as inputs;

a process which outputs, by the second encrypting unit of the data concealing device, an encrypted text that is obtained by encrypting the input data with the key, the encrypted text satisfying a relationship where the sum of an encrypted text 1 obtained by encrypting a plaintext 1 with a key 1 and an encrypted text 2 obtained by encrypting a plaintext 2 with a key 2 is equal to an encrypted text obtained by encrypting the sum of the plaintext 1 and the plaintext 2 with the sum of the key 1 and the key 2;

a process which generates, by a second key generating unit of the data concealing device, the key to be input to the second encrypting unit;

a process which receives, by an auxiliary data generating unit of the data concealing device, the input data and the key generated by the second key generating unit, as inputs;

a process which outputs, by the auxiliary data generating unit of the data concealing device, the second auxiliary data for verifying that a Hamming distance between a plaintext of the second encrypted text output from the second encrypting unit and a plaintext of the first encrypted text output from the first encrypting unit in the registration data generating device is equal to or less than a predetermined certain value;

a process which receives, by an identifier holding unit of the specified data matching device, an identifier, as an input;

a process which outputs, by the identifier holding unit of the specified data matching device, the identifier to the identifier managing unit in the storage device;

a process which instructs, by the identifier holding unit of the specified data matching device, the identifier managing unit to output the encrypted text and the auxiliary data that correspond to the identifier;

a process which receives, by an encrypted text subtracting unit of the specified data matching device, the first encrypted text output from the second encrypting unit in the data concealing device and the encrypted text read from the encrypted text storage unit in the storage device, as inputs;

a process which outputs, by the encrypted text subtracting unit of the specified data matching device, a difference between the input two encrypted texts;

a process which receives as inputs, by a matching determining unit:
  the difference between the first and second encrypted texts, the difference being output from the encrypted text subtracting unit;
  the first auxiliary data read from the auxiliary data storage unit in the storage device; and
  the second auxiliary data output from the auxiliary data generating unit in the data concealing device, a process which transmits to a one-way converting unit, by the matching determining unit, intermediate data which is generated based on the difference between the first and second encrypted texts output from the encrypted text subtracting unit and on the second auxiliary data output from the auxiliary data generating unit in the data concealing device, and a process which determines, by the matching determining unit, whether a Hamming distance between plaintexts corresponding to the difference between the first and second encrypted texts is equal to or less than a predetermined certain value, by determining whether post-one-way conversion data generated by the one-way converting unit based on the intermediate data is equal to one piece of the first auxiliary data that underwent one-way conversion and is stored in the auxiliary data storage unit in the storage device;

a process which receives, by the one-way converting unit, as an input, the intermediate data calculated by the matching determining unit;

a process which outputs a result of one-way conversion performed on the intermediate data; and a process which controls, by a control unit, data exchanges between the data concealing device and the specified data matching device.

* * * * *